(12) United States Patent
Mahkonen et al.

(10) Patent No.: US 10,003,970 B2
(45) Date of Patent: Jun. 19, 2018

(54) COORDINATOR AND DEVICE IN A RADIO COMMUNICATION NETWORK

(71) Applicant: TELEFONAKTIEBOLAGET L M ERICSSON (PUBL), Stockholm (SE)

(72) Inventors: Heikki Mahkonen, San José, CA (US); Petri Jokela, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 13 days.

(21) Appl. No.: 14/891,519

(22) PCT Filed: May 16, 2013

(86) PCT No.: PCT/SE2013/050552
§ 371 (c)(1),
(2) Date: Nov. 16, 2015

(87) PCT Pub. No.: WO2014/185839
PCT Pub. Date: Nov. 20, 2014

(65) Prior Publication Data
US 2016/0088477 A1 Mar. 24, 2016

(51) Int. Cl.
*H04W 12/06* (2009.01)
*H04W 4/00* (2018.01)
(Continued)

(52) U.S. Cl.
CPC ......... *H04W 12/06* (2013.01); *H04L 61/6081* (2013.01); *H04L 63/083* (2013.01);
(Continued)

(58) Field of Classification Search
CPC ..... H04W 12/06; H04W 4/005; H04W 8/005; H04L 61/6081
See application file for complete search history.

(56) References Cited

U.S. PATENT DOCUMENTS

| 2012/0047558 A1* | 2/2012 | Sundaram ........... H04L 63/0869 726/3 |
| 2013/0094444 A1 | 4/2013 | Lai et al. |
| 2014/0211659 A1* | 7/2014 | Abraham .......... H04W 52/0209 370/254 |

FOREIGN PATENT DOCUMENTS

EP 2515583 A1 10/2012

OTHER PUBLICATIONS

Wu et al. (M2M: From Mobile to Embedded Internet, IEEE Communications Magazine o Apr. 2011, pp. 36-43).*
(Continued)

*Primary Examiner* — Oleg Korsak

(57) ABSTRACT

A method in a coordinator in a radio communication network. The method comprises obtaining a token identifying a radio device. The method also comprises obtaining information confirming that the radio device is authorized to connect to the coordinator. The method also comprises calculating a device filter comprising a plurality of tokens, wherein the plurality of tokens include the obtained token of the radio device and identifies a plurality of devices authorized to connect to the coordinator. The method also comprises sending a broadcast radio signal comprising the device filter. The method also comprises allowing the radio device to connect to the coordinator. The present disclosure also relates to a coordinator, as well as to a radio device and a method of a radio device.

14 Claims, 3 Drawing Sheets

(51) Int. Cl.
*H04L 29/12* (2006.01)
*H04L 29/06* (2006.01)
*H04W 8/00* (2009.01)
*H04W 84/18* (2009.01)

(52) U.S. Cl.
CPC ........... *H04W 4/005* (2013.01); *H04W 8/005* (2013.01); *H04W 4/001* (2013.01); *H04W 84/18* (2013.01)

(56) References Cited

OTHER PUBLICATIONS

IEEE Std 802.15.4, IEEE Standard for Local and metropolitan area networks, Part 15.4: Low-Rate Wireless Personal Area Networks (LR-WPANs), Jun. 16, 2011.
Definition of Bloom filter, http://en.wikipedia.org/wiki/Bloom_filter, retrieved on Apr. 10, 2013.

* cited by examiner

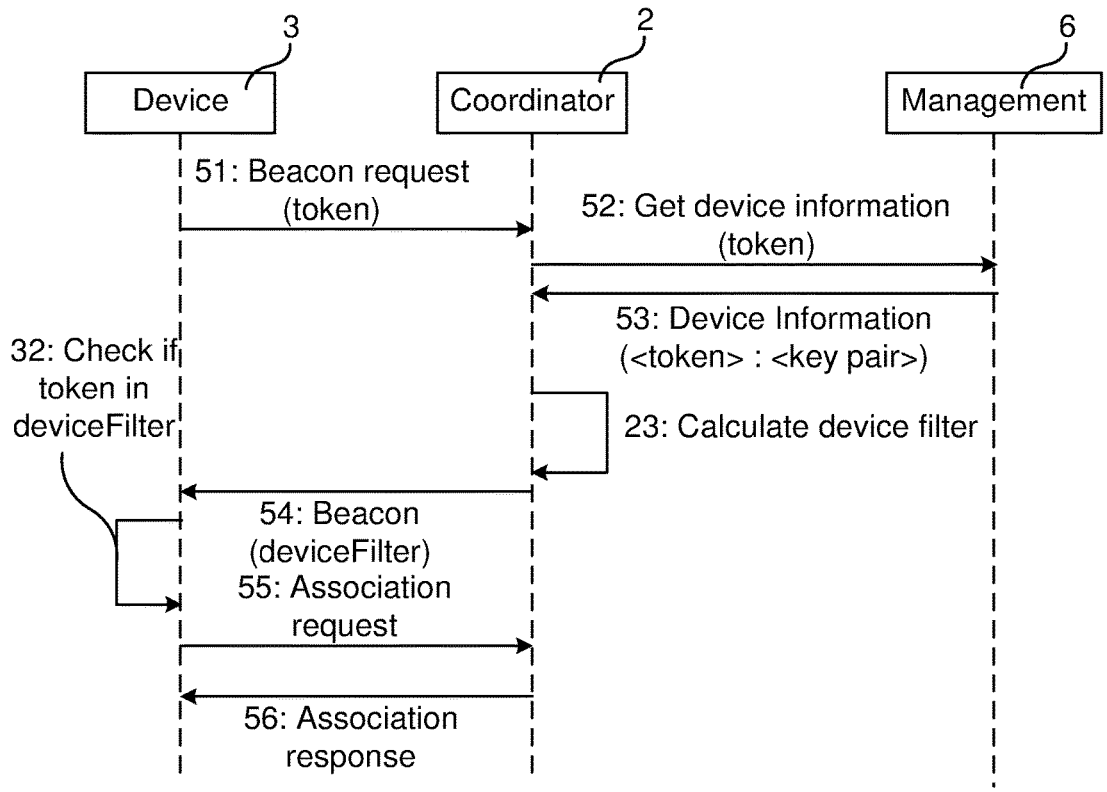
Fig. 5
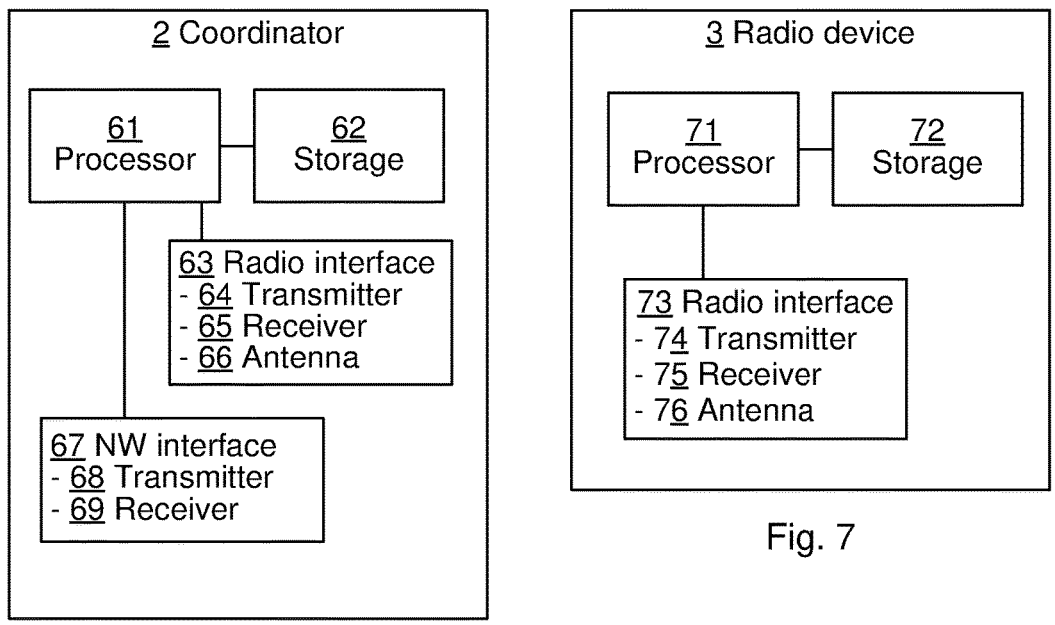
Fig. 6
Fig. 7

COORDINATOR AND DEVICE IN A RADIO COMMUNICATION NETWORK

This application is a 371 of International Application No. PCT/SE2013/050552, filed May 16, 2013, the disclosure of which is fully incorporated herein by reference.

TECHNICAL FIELD

The present disclosure relates to a coordinator and a radio device in a radio communication network, and methods thereof. Specifically, the disclosure relates to determining whether a radio device is authorised to connect to the coordinator and to inform the radio device accordingly.

BACKGROUND

When Machine-to-Machine (M2M) devices are using Wireless Personal Area Network (WPAN) technology like IEEE 802.15.4 e.g. ZigBee, a device needs to be attached to the Internet through a M2M Gateway (GW). The M2M GW acts as the WPAN coordinator in this case. The attachment and configuration between the M2M GW and the device is one of the hardest deployment burdens. The device needs to be configured to use correct radio channel and PAN identifier etc. in order for it to communicate with the M2M GW. At the same time, there can be other M2M GWs in the vicinity of the user's GW. This might cause the devices to attach to a wrong M2M GW (e.g. neighbour's M2M GW).

The specification of the Institute of Electrical and Electronics Engineers (IEEE) number 802.15.4-2011 describes how machine-to-machine (M2M) devices can discover wireless personal area network (wireless PAN or WPAN) coordinators by active or passive scanning mechanisms. In active scanning the M2M device sends beacon request frames to a broadcast address on all of its channels and listens to incoming beacon frames. When passive scanning is used, the M2M device goes through all of its channels and listens to periodic beacon frames sent by the WPAN coordinators. The M2M device will store a PANDescriptor from each beacon frame it receives. These descriptions (i.e. PANDescriptor:s) hold configuration information (e.g. WPAN channel, PAN identifier, coordinator address, etc.) about the WPAN network served by the coordinator. After the M2M device has discovered all WPAN coordinators on all channels, it can choose a suitable WPAN and associate itself to the network. The algorithm for choosing the suitable PAN is left outside of the scope of the IEEE specification. Typically, the device chooses to associate itself with the coordinator with the strongest beacon signal, and if the coordinator rebuffs the device, it will try the second strongest and so on. Alternatively or additionally, as described below, the M2M network is set up by an operator who associates each of the devices with a suitable coordinator, one by one.

Wireless short-range networks such as PANs require a lot of manual configuration effort for deployment of devices, update of device configurations (e.g. when devices move between networks from one coordinator to another), when devices are in coverage of overlapping M2M networks. Standard solutions do not provide auto-/zero-configuration for network deployment.

When deploying wireless M2M sensor networks, the network configuration requires manual configuration of all the devices in the network. In order to connect the devices to a wireless M2M network, the network administrator must ensure that each device is using the correct radio channel, addresses, and PAN identifier etc.

If M2M devices are moved between M2M networks, in worst case the configuration must be updated manually in order for the device to connect to the new network. Manual configuration from moving M2M devices is not a scalable model if the M2M devices are required to move unlimitedly.

When multiple M2M networks are configured in the same geographical area (e.g. homes in an apartment building, city centrums, etc.) the M2M devices must be aware of the correct M2M network they belong to. This might become hard when multiple networks are using same configurations between each other.

In addition, automatic security key distribution has not been solved for IEEE 802.15.4. This makes it hard to utilize the built in security features of the standard.

SUMMARY

As discussed above, bringing new M2M devices into a M2M network requires manual configuration. This disclosure provides users an easy to use, or automatic, interface to indicate devices belonging to the users M2M network for the M2M GW. In addition, this invention describes a protocol between the M2M GW and devices enabling the GW to collect the correct devices into the M2M network it is serving. For example, this disclosure specifies a way to extend the PANDescriptor with the required information (e.g. a Bloom filter) for the M2M device to determine whether it is allowed to connect to/associate with the coordinator of a WPAN network or not.

According to an aspect of the present disclosure, there is provided a method performed in a coordinator in a radio communication network. The method comprises obtaining a token identifying a radio device. The method also comprises obtaining information confirming that the radio device is authorised to connect to the coordinator. The method also comprises calculating a device filter comprising a plurality of tokens, wherein the plurality of tokens include the obtained token of the radio device and identifies a plurality of devices authorised to connect to the coordinator. The method also comprises sending a broadcast radio signal comprising the device filter. The method also comprises allowing the radio device to connect to the coordinator.

According to another aspect of the present disclosure, there is provided a computer program product comprising computer-executable components for causing a coordinator to perform an embodiment of a method in a coordinator of the present disclosure when the computer-executable components are run on processor circuitry comprised in the coordinator.

According to another aspect of the present disclosure, there is provided a coordinator configured for use in a radio communication network. The coordinator comprises communication circuitry configured for radio communication with a radio device, processor circuitry, and a storage unit storing instructions that, when executed by the processor circuitry, cause the coordinator to obtain a token identifying the radio device. The instructions also cause the coordinator to obtain information confirming that the radio device as identified by the obtained token is authorised to connect to the coordinator. The instructions also cause the coordinator to calculate a device filter comprising a plurality of tokens, wherein the plurality of tokens include the obtained token of the radio device and identifies a plurality of devices authorised to connect to the coordinator. The instructions also cause the coordinator to send a broadcast signal comprising the device filter. The instructions also cause the coordinator to allow the radio device to connect to the coordinator.

According to another aspect of the present disclosure, there is provided a computer program for a coordinator in a radio communication network. The computer program comprises computer program code which is able to, when run on processor circuitry in the coordinator, cause the coordinator to obtain a token identifying a radio device. The code is also able to cause the coordinator to obtain information confirming that the radio device as identified by the obtained token is authorised to connect to the coordinator. The code is also able to cause the coordinator to calculate a device filter comprising a plurality of tokens, wherein the plurality of tokens include the obtained token of the radio device and identifies a plurality of devices authorised to connect to the coordinator. The code is also able to cause the coordinator to send a broadcast signal comprising the device filter. The code is also able to cause the coordinator to allow the radio device to connect to the coordinator.

According to another aspect of the present disclosure, there is provided a computer program product comprising an embodiment of a computer program for a coordinator according to the present disclosure and a computer readable means on which the computer program is stored.

According to another aspect of the present disclosure, there is provided a method performed in a radio device in a radio communication network. The method comprises receiving a broadcast signal from a coordinator in the radio communication network. The broadcast signal comprises a device filter comprising a plurality of tokens identifying a plurality of devices authorised to connect to the coordinator. The method also comprises determining that a token identifying the radio device is included in the device filter. Thereby the radio device is informed that it is authorised to connect to the coordinator. The method also comprises connecting to the coordinator.

According to another aspect of the present disclosure, there is provided a computer program product comprising computer-executable components for causing a radio device to perform an embodiment of a method in a radio device when the computer-executable components are run on processor circuitry comprised in the radio device.

According to another aspect of the present disclosure, there is provided a radio device configured for use in a radio communication network. The radio device comprises communication circuitry configured for radio communication with a coordinator in the radio communication network, processor circuitry, and a storage unit storing instructions that, when executed by the processor circuitry, cause the radio device to receive a broadcast signal from the coordinator. The broadcast signal comprises a device filter comprising a plurality of tokens identifying a plurality of devices authorised to connect to the coordinator. The instructions also cause the radio device to determine that a token identifying the radio device is included in the device filter, informing the radio device that it is authorised to connect to the coordinator. The instructions also cause the radio device to connect to the coordinator.

According to another aspect of the present disclosure, there is provided a computer program for a radio device in a radio communication network. The computer program comprises computer program code which is able to, when run on processor circuitry in the radio device, cause the radio device to receive a broadcast signal from a coordinator in the radio communication network. The broadcast signal comprises a device filter comprising a plurality of tokens identifying a plurality of devices authorised to connect to the coordinator. The code is also able to cause the radio device to determine that a token identifying the radio device is included in the device filter, informing the radio device that it is authorised to connect to the coordinator. The code is also able to cause the radio device to connect to the coordinator.

According to another aspect of the present disclosure, there is provided a computer program product comprising an embodiment of a computer program for a radio device according to the present disclosure and a computer readable means on which the computer program is stored.

Embodiments of the present disclosure reduces the manual configuration task required for configuration and deployment of e.g. IEEE 802.15.4 WPANs. In addition, embodiments of the disclosure describes a way for a coordinator (e.g. a M2M GW) to learn the identity of the radio devices allowed into its network. Embodiments of the disclosure also describes a way for radio devices to verify, based on broadcast information, if they are allowed to associate to the network or not. By a coordinator broadcasting (beacon) a device filter comprising tokens identifying each radio device allowed to connect to (also called to associate with) the coordinator, the radio devices can automatically determined which coordinator, and thus which network, to connect to, without time consuming manual configuration by an operator. If the device filter is included in a regular (standard) frame format, such as a beacon frame or command frame, embodiments of the present disclosure may be employed without the need for changes in the standard, e.g. Zigbee standard. In order to fit as many device tokens as needed into the device filer limited by a frame format, a mathematical function may be applied to the device tokens. For example, a Bloom filter may be used for the device filter. Further embodiments of the present disclosure are discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5 is a schematic signalling diagram illustrating an embodiment of the present disclosure.

FIG. 6 is a schematic block diagram of an embodiment of a coordinator of the present disclosure.

FIG. 7 is a schematic block diagram of an embodiment of a radio device of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
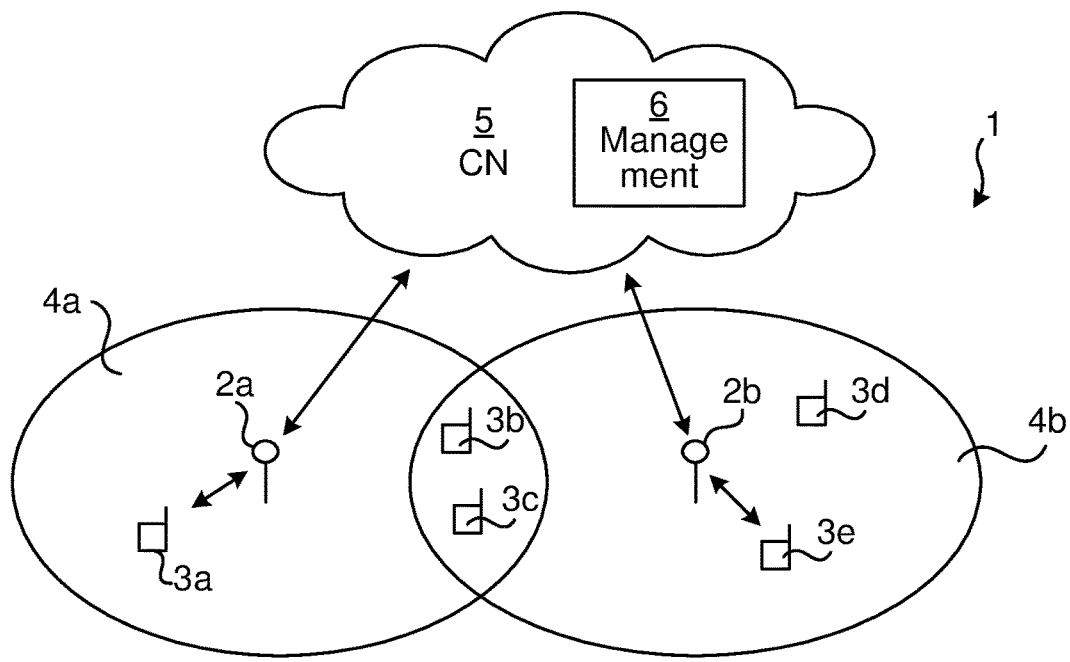
FIG. 1 is a schematic illustration of an embodiment of a radio communication network in accordance with the present disclosure.

FIG. 1 schematically illustrates an embodiment of a communication network 1. A plurality of coordinators 2 e.g. M2M GWs are deployed and communicates (via wire, or wirelessly over a radio interface) with a core network (CN) 5 and/or the Internet. The coordinators 2a and 2b serve respective cells 4a and 4b which cover a geographical area. The coordinators may in this sense be regarded as radio base stations or access points. A plurality of radio devices 3 are deployed within the area covered by the coordinators 2. A radio device 3 may be any device or user equipment (UE), mobile or stationary, enabled to communicate over a radio channel in a communications network, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or personal computer (PC). In the present disclosure, the coordinators 2 and radio devices 3 are exemplified as being M2M communication devices part of WPAN networks, but other networks such as local area networks (LAN:s) are also contemplated. The radio devices 3 may be so called constrained nodes, e.g. in a M2M network. According to a common definition, a constrained node is a node where some of the characteristics that are otherwise pretty much taken for granted for Internet nodes in 2013 are not attainable, often due to cost constraints and/or physical constraints on characteristics such as size, weight, and available power. Examples of constraints include constraints on the maximum code complexity (read only memory (ROM)/Flash); constraints on the size of state and buffers (random access memory (RAM)); and constraints on the available power. The radio devices 3 may e.g. be sensors deployed for an extended time with a battery, possibly in combination with solar cells, as power source. In FIG. 1, five radio devices 3a-e are shown, but it is contemplated that each coordinator 2 may serve many more radio devices 3, e.g. more than ten radio devices or more than a hundred radio devices or more than a thousand radio devices. The communication network 1 may further comprise a management functionality 6. This management functionality may e.g. be comprised in the CN 5 (as shown in FIG. 5), but it is also contemplated to include the management functionality 6, or parts of the management functionality 6, in at least one, possibly all, of the coordinators 2. In FIG. 1, radio device 3a is connected to coordinator 2a, and radio device 3e is connected to coordinator 2b. Radio devices 3b-d are not yet connected to a coordinator 2. Radio device 3d is within the cell 4b served by coordinator 2b and could thus connect to coordinator 2b if allowed by the communication system 1. Radio devices 3b and 3c are within both cells 4a and 4b, why they are able to connect to either of coordinator 2a and coordinator 2b depending on whether they are allowed. The present disclosure provides methods and apparatuses (radio devices 3 and coordinators 2) for automatically connecting any of the radio devices 3b and 3c with a suitable coordinator 2a or 2b.

Figure 2:
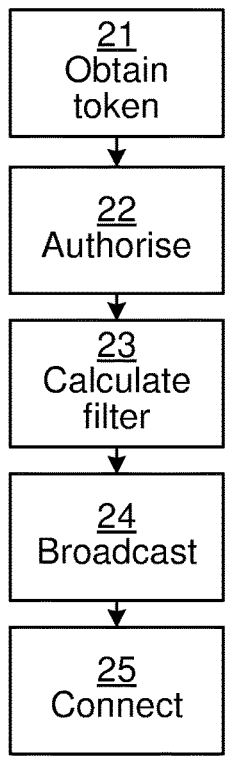
FIG. 2 is a schematic flow chart of an embodiment of a method in a coordinator, in accordance with the present disclosure.

FIG. 2 is a flow chart illustrating an embodiment of a method performed by a coordinator 2 in accordance with the present disclosure. A token identifying a radio device 3 is obtained 21. The token may be any code, number or similar that identifies, preferably uniquely identifies, the radio device 3 in the communication network 1 or globally. Information confirming that the radio device 3 is authorised to connect to the coordinator 2 is then obtained 22. This information may e.g. be preprogrammed in the coordinator, inputted into the coordinator by a user, obtained from a network 1 server e.g. the management functionality 6. A device filter comprising a plurality of tokens is calculated 23. The plurality of tokens include the obtained token of the radio device 3 and identifies a plurality of devices authorised to connect to the coordinator 2. Thus, the device filter, e.g. a Bloom filter, includes tokens identifying many, preferably all, radio devices 3 allowed to connect to the coordinator 2. Since the radio device 3 is authorised to connect to the coordinator, the token identifying the radio device is included in the device filter. The device filter may be recalculated as authorizations change such that it is updated and includes the tokens of the radio devices 3 currently authorised to connect to the coordinator 2. A broadcast radio signal 54, e.g. a beacon, comprising the calculated device filter is sent 24 by the coordinator 2. When/if the radio device 3 who's token is included in the device filter receives the broadcasted device filter, the radio device 3 is informed that it is authorised to connect to the coordinator 2, and thus initiates a connection protocol for connecting to the coordinator. Since the radio device is authorised, the coordinator then allows 25 the radio device 3 to connect to the coordinator 2. The radio device 3 and the coordinator 2 may connect to/associate with each other in any suitable way, e.g. in accordance with a standard protocol. Typically, the radio device 3 will send a request message to the coordinator, requesting to be allowed to connect, and the coordinator 2 responds with a grant message, informing the radio device that it is allowed to connect.

In some embodiments of the present disclosure, the step of obtaining 21 a token comprises receiving a radio signal from the radio device, said radio signal comprising the token identifying the radio device. Thus, the radio device may send a radio signal including its token. This signal may be directed specifically to the coordinator 2, or it may be generally broadcast to all coordinators within range. This may be a convenient way for the radio device to inform coordinators in range of its existence and urges the coordinators to check whether the radio device is allowed to connect.

In some embodiments of the present disclosure, the obtaining 22 information comprises sending a request comprising the obtained 21 token to a management functionality 6, and receiving a response from said management functionality. The response indicates to the coordinator 2 that the radio device is authorised to connect to the coordinator. This may be one convenient way for the coordinator to determine whether the token relates to an authorised radio device or not. As mentioned above, the management functionality may be comprised in the coordinator itself, or be comprised higher up in the communication network. The management functionality may hold a database of authorised radio devices for the coordinator and possibly also for other coordinators in the communication network 1. The database may be managed by a user, e.g. via a user interface of the management functionality such as via an internet protocol (IP) user interface.

In some embodiments of the present disclosure, the device filter is a Bloom filter. As mentioned herein, a Bloom filter may be a convenient way of including the tokens in the device filer. Bloom filters are statistical data structures, where a set of tokens (corresponding to the authorised radio devices 3) can be stored in a fixed size, space efficient filter. An initially zero m bits long string is filled with the tokens from the set by running k different hash functions over each of the tokens, resulting k different index values {0 . . . m−1} for each token. All of these bits are set to one in the filter. Using the filter, it is possible verify if a token is included in the set or not. The verified token is hashed with the same k different hash functions. If all the bits in the filter are set to one, the verification results in a positive answer. If any of the bits is zero, the token does not belong to the set. While the Bloom filter is probabilistic, the verification may result in false positives, i.e. the verification returns a positive answer even if the token has not been included in the filter. However, false negatives are not possible, and if the verification returns negative, it is known that the item is not a member of the set.

In some embodiments of the present disclosure, the radio communication network 1 is a machine-to-machine, M2M, network. As mentioned herein, the present disclosure may be especially beneficial for a M2M network such as a WPAN.

In some embodiments of the present disclosure, the radio communication network 1 is a wireless personal area network, WPAN.

In some embodiments of the present disclosure, the radio communication network 1 uses an IEEE 802.15.4 communication protocol, e.g. a ZigBee communication protocol, and the allowing 25 the radio device to connect comprises allowing the radio device 3 to connect in accordance with said ZigBee communication protocol. ZigBee is a communication protocol which may be beneficially used with embodiments of the present disclosure, but also other communication protocols are contemplated, such as WLAN or Bluetooth.

In some embodiments of the present disclosure, the radio device 3 is a stationary sensor. Such sensors, typically having limited power supply from a battery, are common in M2M networks where the present disclosure may be beneficial. However, mobile sensors or other types of radio devices are also possible, as mentioned herein.

In some embodiments of the present disclosure, the token is a media access control (MAC) address or a serial number of the radio device. These are examples of suitable uniquely identifying tokens which may be flashed into radio devices 3. In some embodiments, the token is a code flashed into the radio device 3.

Figure 3:
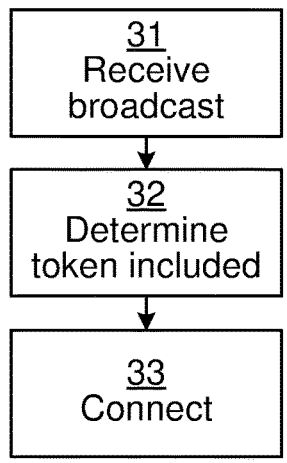
FIG. 3 is a schematic flow chart of an embodiment of a method in a radio device, in accordance with the present disclosure.

FIG. 3 is a schematic flow chart of an embodiment of a method performed by a radio device 3. A broadcast signal is received 31 from a coordinator 2 in the radio communication network, said broadcast signal comprising a device filter comprising a plurality of tokens identifying a plurality of devices authorised to connect to the coordinator 2. It is then determined 32 that a token identifying the radio device 3 is included in the device filter. The fact that the token is included, informs the radio device that it is authorised to connect to the coordinator 2. The radio device 3 then connects 33 to the coordinator 2.

Figure 4:
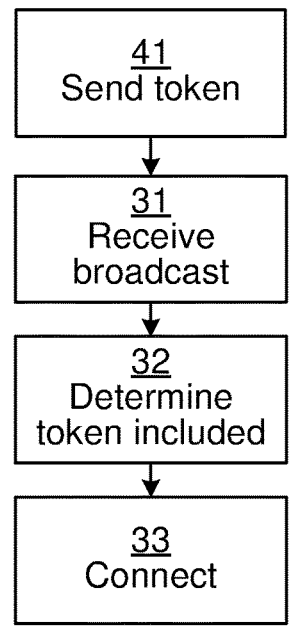
FIG. 4 is a schematic flow chart of another embodiment of a method in a radio device, in accordance with the present disclosure.

FIG. 4 is a schematic flow chart of an embodiment of a method performed by a radio device 3. In this embodiment, the radio device sends 41 a radio signal to the coordinator 2, prior to the receiving 31 a broadcast signal. The radio signal comprises the token identifying the radio device 3. As discussed above, this is one way the coordinator can obtain 21 the token identifying the radio device 3. Then, the method steps discussed in relation to FIG. 3 may follow. A broadcast signal is received 31 from a coordinator 2 in the radio communication network, said broadcast signal comprising a device filter comprising a plurality of tokens identifying a plurality of devices authorised to connect to the coordinator 2. It is then determined 32 that a token identifying the radio device 3 is included in the device filter. The fact that the token is included, informs the radio device that it is authorised to connect to the coordinator 2. The radio device 3 then connects 33 to the coordinator 2.

EXAMPLES

Example 1—Frame Formats

To encode the new device filter information about M2M devices 3 belonging to a M2M network, the network coordinator 2 will add the device filter to the payload field of a beacon frame shown in table 1. The payload field is 52 bytes in size according to IEEE 802.15.4 and this entire field can be used for the new device filter in the beacon frame:

aMaxPHYPacketSize=127 aMaxBeaconOverhead=75 aMaxBeaconPayloadLength=aMaxPHYPacketSize−aMaxBeaconOverhead=52 bytes

TABLE 1

| IEEE 802.15.4 beacon frame format | | | | | | | | |
|---|---|---|---|---|---|---|---|---|
| Octets: 2 | 1 | 4/10 | 0/5/6/10/14 | 2 | variable | variable | variable | 2 |
| Frame control | Sequence number | Addressing fields | Auxiliary security header | Superframe specification | GTS fields | Pending address fields | Beacon payload | FCS |
| MHR | | | | MAC payload | | | | MFR |

MHR=MAC header, MFR=MAC footer

When the M2M device 3 is using active scanning it will send beacon request frames shown in table 2. The M2M device can add its device token into the payload of this frame. The coordinator 2 can use the token to verify whether the M2M device is part of the M2M network served by the coordinator 2. It is noted that each coordinator serves its own M2M network, why the communication network 1 comprises a plurality of M2M networks, one per coordinator 2. If the device 3 belongs to the M2M network of the coordinator 2, it can add the token to its device filter in the beacon frames. There is room for 118 bytes in the beacon request for the device token:

aMaxPHYPacketSize=127 beaconRequestSize=9

Payload size=aMaxPHYPacketSize−beaconRequestSize=118 bytes

TABLE 2

| | | | | | | |
|---|---|---|---|---|---|---|
| IEEE 802.15.4 command frame format (CF Identifier 0x07 Beacon request) | | | | | | |
| Octets: 2 | 1 | variable | 0/5/6/10/14 | 1 | variable | 2 |
| Frame control | Sequence number | Addressing fields | Auxiliary security header | Command frame identifier | Command payload | FCS |
| | | MHR | | | MAC payload | MFR |

If the M2M network is large (should serve many radio devices 3) and the 52 bytes of payload in the beacon frame is not enough space for the device filter, the filter could be sent in a general data frame that has a maximum payload size of 102 bytes:

aMaxPHYPacketSize=127
aMaxMPDUUnsecuredOverhead=25
aMaxMACSafePayloadSize=aMaxPHYPacketSize
aMaxMPDUUnsecuredOverhead=102 bytes

TABLE 3

| | | | | | | | | |
|---|---|---|---|---|---|---|---|---|
| General IEEE 802.15.4 frame format | | | | | | | | |
| Octets: 2 | 1 | 0/2 | 0/2/8 | 0/2 | variable | variable | variable | 2 |
| Frame control | Sequence number | Destination PAN identifier | Destination address | Source PAN identifier | Source address | Auxiliary security header | Frame payload | FCS |
| | | | Addressing fields | | | | | |
| | | | MHR | | | | MAC payload | MFR |

If a general data frame is used to send the device filter, all M2M devices 3 receiving this frame should update the stored PANDescription with the longer filter received in this frame and not use the shorter format received in the beacon frame.

Example 2—Device Filter (Token)

Each device has a unique identifier, the device token, that will be used to identify the device 3 in the network 1. The token can be generated from e.g. the MAC address of the device, that is hashed with k different hash functions, resulting in k index values to be set in the device filter by the coordinator 2. The token may alternatively be directly an m-bit long identifier with e.g. five bits set to one, without the need for any hash operations in the devices.

The device filter is 52 bytes=416 bits long. This is used fully to store the device information in the coordinator 2. The coordinator sets all the radio device tokens in the filter by setting each device's token bits to one in the filter. Once all the items are inserted, the coordinator puts the filter in the beacon and sends it.

When a device 3 receives the device filter in the beacon, it can verify if it belongs to the set that is included in the filter by verifying its own token bits in the filter. If this verification returns positive, the device connects to the coordinator that sent the beacon.

Due to false positives, it may sometimes happen that a device 3 incorrectly matches the device filter in the beacon. The probability for this can be calculated from the equation $$p=(1-e^{-kn/m})^k$$

where k is the number of different hash functions, n is the number of tokens inserted in the filter, and m is the size of the filter. Thus, having e.g. m=416, k=5 and inserting 50 device tokens in the filter, would result in false positive probability for devices 3 that are not part of the set as $$p=(1-e^{-(5*50/416)})^5 \approx 0.019$$

Example 3

To enable the functionality described in the present disclosure, the WPAN coordinator 2 requires an interface (e.g. a graphical user interface (GUI), a Simple network management protocol (SNMP), or such) that can be used to store device information of devices 3 that belong to the M2M network serviced by the coordinator 2. This can be implemented with a local database in the coordinator that holds the device information. The user/administrator/owner of the M2M network should have a way to add, delete, and update the device information in the database. This would provide a manual way for users to specify devices that belong to their networks.

To fully utilize the new functionality, however, the coordinator 2 should have access to an automated management functionality 6 that can look up device information from its own database holding information for different subscribers (coordinators 2) and devices 3 that belong to these subscribers. In addition, the management functionality could be used to look up the device information from external data storages (e.g. device information database of the device manufacturers).

For example if the WPAN coordinator 2 is a M2M GW that is connected to a third generation partnership program (3GPP) network, the subscription information connected to its Internet access can identify the owner of the network (e.g. user that pays the bill). In addition, the Internet Service Provider (ISP) providing the Internet access could sell the automated management feature for the user and therefore provide device lookup service for the user. The M2M gateway could request identification of M2M devices 3 when seen in the M2M network (e.g. beacon request is received) and verify from the user whether the device belongs to him/her. Once the user has provided verification of ownership (e.g. short message service (SMS) text message of product key, or such) the management functionality 6 could retrieve the device information from vendor storage and enable association to the network for the M2M device 3.

An example message sequence diagram of the functionality of an embodiment of the present disclosure is shown in FIG. 5, showing an IEEE 802.15.4 attachment procedure with the new device filter.

51. Beacon Request (token): If M2M device 3 is doing active scanning it will send beacon request frames on all channels it is scanning. The M2M device can add a device token into the payload field of the request.

52. Get Device Information (token): Coordinator 2 can request device information from a management function 6 with the device token. The management functionality can be a function running in the coordinator 2 itself or a management functionality provided by the network 1 (e.g. access network of the ISP).

53. Device Information (<token>:<key pair>): If the M2M device 3 identified by the device token belongs to the M2M network of the coordinator 2, the management function can send the device information to the coordinator to indicate that this device should be allowed to attach to the network of the coordinator. The device information can include the private/public key pair of the M2M device that can be used for authentication of the device association.

23. Calculate Device Filter: When coordinator 2 receives a new device information it will construct a new device filter by including the new device token into the filter. The device filter will be added into subsequent beacon frames to inform M2M devices 3 if they belong to the M2M network of the coordinator 2.

54. Beacon ("deviceFilter"): Coordinator sends a beacon frame periodically or as a reply to a beacon request. Coordinator 2 will include the device filter into the frame.

32. Check if token in device filter: The M2M device 3 will scan the channels as specified in the IEEE standard and store the PANDescriptors. The new device filter from the received beacon frame should be stored into this data structure as well. After it has scanned through all the channels, the device 3 should decide into which M2M network it should associate itself to. It will go through the stored PANDescriptors and check the stored device filters and verify if its own device token has been encoded into the device filter. If it finds a device filter holding the device token of the device 3 it will initiate association/connection to the coordinator 2 that sent the device filter.

55. Association Request: M2M device 3 sends an association request to the coordinator 3 as described in the IEEE standard.

56. Association Response: Coordinator 2 replies to the association request as described in the IEEE standard.

Example 4

FIG. 6 illustrates an embodiment of a coordinator 2 of the present disclosure. The coordinator 2 comprises a processor/processor circuitry 61 e.g. a central processing unit (CPU). The processor 61 may comprise one or a plurality of processing units in the form of microprocessor(s). However, other suitable devices with computing capabilities could be comprised in the processor 61, e.g. an application specific integrated circuit (ASIC), a field programmable gate array (FPGA) or a complex programmable logic device (CPLD). The processor 61 is configured to run one or several computer program(s) or software stored in a storage unit 62 e.g. a memory. The storage unit is regarded as a computer readable means and may e.g. be in the form of a Random Access Memory (RAM), a Flash memory or other solid state memory, or a hard disk. The processor 61 is also configured to store data in the storage unit 62, as needed. The coordinator 2, comprises a radio interface 63 for communication with the radio devices 3 and possibly also with the CN 5. The radio interface 63 comprises a transmitter 64, a receiver 65 and an antenna 66, which may be combined to form a transceiver or be present as distinct units within the coordinator 2. The transmitter 64 is configured to cooperate with the processor to transform data bits to be transmitted over an air interface to a suitable radio signal in accordance with the radio access technology (RAT) used. The receiver 65 is configured to cooperate with the processor 61 to transform a received radio signal to data bits. The antenna 66 may comprise a single antenna or a plurality of antennas, e.g. for different frequencies and/or for MIMO (Multiple Input Multiple Output) communication. The antenna 66 is used by the transmitter 64 and the receiver 65 for transmitting and receiving, respectively, radio signals. Similarly, the coordinator 2 may comprise an additional (wired or wireless) network (NW) interface 67 for communication with the CN 5. The NW radio interface 67 comprises a transmitter 68, a receiver 69 and possibly an antenna (not shown), which may be combined to form a transceiver or be present as distinct units within the coordinator 2. The transmitter 68 is configured to cooperate with the processor to transmit data bits. The receiver 69 is configured to cooperate with the processor 61 to receive data bits.

Example 5

FIG. 7 illustrates an embodiment of a radio device 3 of the present disclosure. The radio device 3 comprises a processor/processor circuitry 71 e.g. a central processing unit (CPU). The processor 71 may comprise one or a plurality of processing units in the form of microprocessor(s). However, other suitable devices with computing capabilities could be comprised in the processor 71, e.g. an application specific integrated circuit (ASIC), a field programmable gate array (FPGA) or a complex programmable logic device (CPLD). The processor 71 is configured to run one or several computer program(s) or software stored in a storage unit 72 e.g. a memory. The storage unit is regarded as a computer readable means and may e.g. be in the form of a Random Access Memory (RAM), a Flash memory or other solid state memory, or a hard disk. The processor 71 is also configured to store data in the storage unit 72, as needed. The radio device 3, comprises a radio interface 73 for communication with the coordinator 2. The radio interface 73 comprises a transmitter 74, a receiver 75 and an antenna 76, which may be combined to form a transceiver or be present as distinct units within the radio device 3. The transmitter 74 is configured to cooperate with the processor to transform data bits to be transmitted over an air interface to a suitable radio signal in accordance with the radio access technology (RAT) used, e.g. ZigBee. The receiver 75 is configured to cooperate with the processor 71 to transform a received radio signal to data bits. The antenna 76 may comprise a single antenna or a plurality of antennas, e.g. for different frequencies and/or for MIMO (Multiple Input Multiple Output) communication. The antenna 76 is used by the transmitter 74 and the receiver 75 for transmitting and receiving, respectively, radio signals.

Example 6

Figure 8:
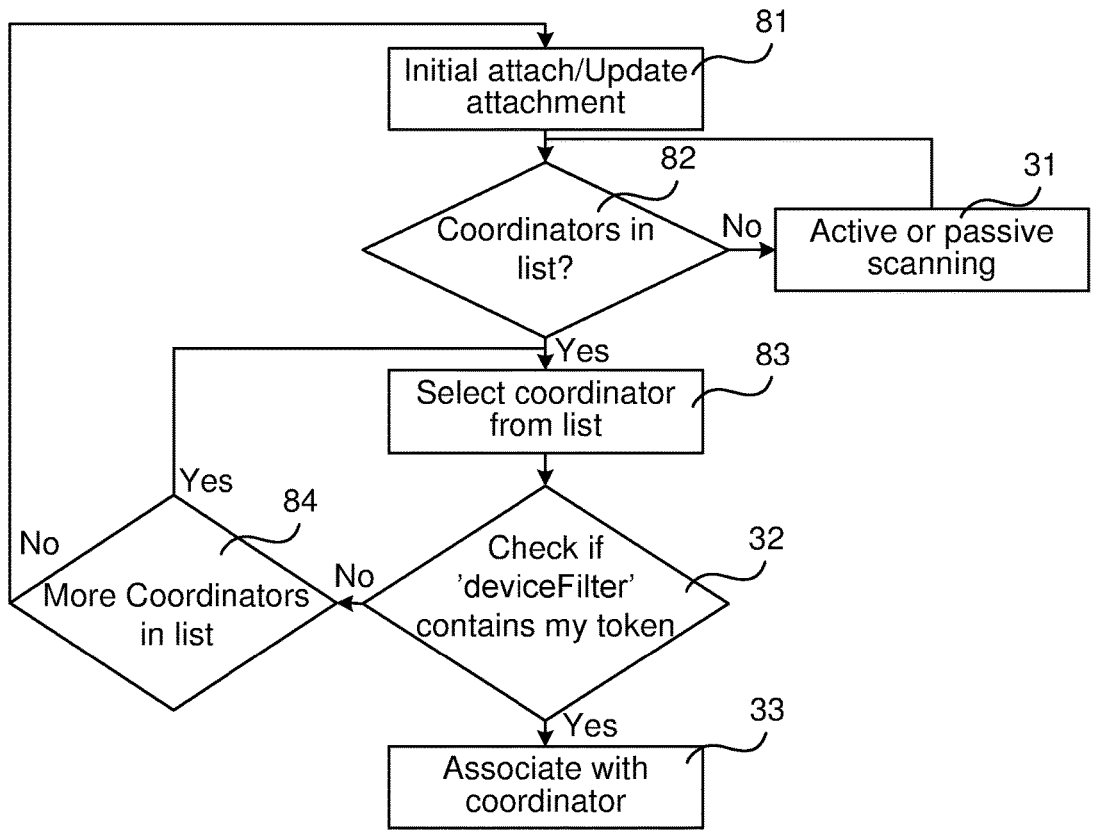
FIG. 8 is a schematic flow chart of an exemplary embodiment of a method of the present disclosure.

FIG. 8 illustrates an algorithm for M2M device 3 to do initial association to a M2M network or to change to another M2M network. M2M device must initiate 81 the algorithm when it is powered on, it loses connectivity to the coordinator 2, or it receives a Disassociation Notification from the coordinator it is currently associated to.

First the device checks 82 if it has coordinators 2 in a coordinator list (PANDescriptions) that it can use (e.g. connectors have not sent Disassociation Notification etc.). If not the device should scan 31 all channels to refresh the coordinator list. The coordinator list is populated based on the received beacon frames during the scanning. When the device has a list of available coordinators it can look through the PANDescriptions by selecting 83 one coordinator after the other (step 84) to check 32 whether a coordinator 2 has sent a device filter containing the device token of the device 3. If the device finds a match it will associate 33 to the coordinator 2, otherwise it can run the algorithm again.

Example 7

Figure 9:
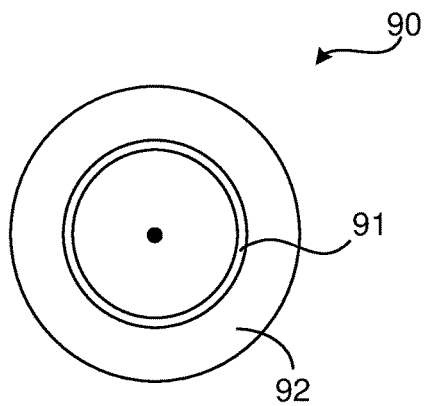
FIG. 9 is a schematic illustration of an embodiment of a computer program product of the present disclosure.

FIG. 9 illustrates a computer program product 90. The computer program product 90 comprises a computer readable medium 92 comprising a computer program 91 in the form of computer-executable components 91. The computer program/computer-executable components 91 may be configured to cause a coordinator 2 or a radio device 3, e.g. as discussed above, to perform an embodiment of a method of the present disclosure. The computer program/computer-executable components may be run on the processor circuitry 61 the coordinator 2 or processor circuitry 71 of the radio device 3 for causing the coordinator/device to perform the method. The computer program product 90 may e.g. be comprised in a storage unit or memory comprised in the coordinator/device and associated with its processor circuitry 61 or 71. Alternatively, the computer program product 90 may be, or be part of, a separate, e.g. mobile, storage means, such as a computer readable disc, e.g. CD or DVD or hard disc/drive, or a solid state storage medium, e.g. a RAM or Flash memory.

Below follow some other aspects of the present disclosure.

According to an aspect of the present disclosure, there is provided a coordinator 2 configured for use in a radio communication network 1. The coordinator comprises means 61, 63 for obtaining 21 a token identifying a radio device 3. The coordinator also comprises means 61 for obtaining 22 information confirming that the radio device 3 is authorised to connect to the coordinator 2. The coordinator also comprises means 61 for calculating 23 a device filter comprising a plurality of tokens, wherein the plurality of tokens include the obtained token of the radio device 3 and identifies a plurality of devices authorised to connect to the coordinator 2. The coordinator also comprises means 61, 63 for sending 24 a broadcast radio signal 54 comprising the device filter. The coordinator also comprises means 61, 63 for allowing 25 the radio device 3 to connect to the coordinator 2.

According to another aspect of the present disclosure, there is provided a radio device 3 configured for use in a radio communication network 1. The radio device comprises means 71, 73 for receiving a broadcast signal 54 from a coordinator 2, said broadcast signal comprising a device filter comprising a plurality of tokens identifying a plurality of devices authorised to connect to the coordinator. The radio device also comprises means 71 for determining that a token identifying the radio device 3 is included in the device filter, informing the radio device that it is authorised to connect to the coordinator 2. The radio device also comprises means 71, 73 for connecting to the coordinator 2.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method in a coordinator of a Machine-to-Machine (M2M) Gateway for controlling access of radio devices in a radio communication network, the method comprising:
   receiving a first broadcast radio signal from a first radio device, the first broadcast radio signal comprising a token identifying the first radio device;
   obtaining information confirming that the first radio device is authorised to connect to the coordinator;
   calculating a device filter comprising the token identifying the first radio device and one or more other tokens obtained by the coordinator, each of the one or more other tokens identifying a respective radio device that is authorised to connect to the coordinator;
   sending a second broadcast radio signal comprising the device filter;
   receiving an association request from the first radio device in response to the second broadcast radio signal; and
   allowing the first radio device to connect to the coordinator in response to the association request.

2. The method of claim 1, wherein the obtaining information comprises sending a request comprising the token identifying the first radio device to a management functionality and receiving a response from said management functionality, which response indicates to the coordinator that the first radio device is authorised to connect to the coordinator.

3. The method of claim 1, wherein the device filter is a Bloom filter.

4. The method of claim 1, wherein the radio communication network is a machine-to-machine (M2M) network.

5. The method of claim 1, wherein the radio communication network is a wireless personal area network (WPAN).

6. The method of claim 1, wherein the radio communication network uses an IEEE 802.15.4 communication protocol, and wherein the allowing the first radio device to connect comprises allowing the first radio device to connect in accordance with said communication protocol.

7. The method of claim 1, wherein the first radio device is a stationary sensor.

8. The method of claim 1, wherein the token is a media access control (MAC) address or a serial number of the first radio device.

9. A coordinator in a Machine-to-Machine (M2M) Gateway for controlling access of radio devices, configured for use in a radio communication network, the coordinator comprising:
   communication circuitry configured for radio communication with a first radio device;
   processor circuitry; and
   a storage unit storing instructions that, when executed by the processor circuitry, cause the coordinator to:
      receive a first broadcast radio signal from the first radio device, the first broadcast radio signal comprising a token identifying the first radio device;
      obtain information confirming that the first radio device as identified by the token received in the first broadcast radio signal is authorised to connect to the coordinator;
      calculate a device filter comprising the token identifying the first radio device and one or more other tokens obtained by the coordinator, each of the one or more other tokens identifying a respective device that is authorised to connect to the coordinator;

send a second broadcast radio signal comprising the device filter;

receive an association request from the first radio device in response to the second broadcast radio signal; and allow the first radio device to connect to the coordinator in response to the association request.

10. A non-transitory computer readable medium for a coordinator in a Machine-to-Machine (M2M) Gateway for controlling access of radio devices in a radio communication network, the non-transitory computer readable medium comprising computer program code which is able to, when run on processor circuitry in the coordinator, cause the coordinator to:

receive a first broadcast radio signal from a first radio device, the first broadcast radio signal comprising a token identifying the first radio device;

obtain information confirming that the first radio device as identified by the token received in the first broadcast radio signal is authorised to connect to the coordinator;

calculate a device filter comprising the token identifying the first radio device and one or more other tokens obtained by the coordinator, each of the one or more other tokens identifying a respective device that is authorised to connect to the coordinator;

send a second broadcast radio signal comprising the device filter;

receive an association request from the first radio device in response to the second broadcast radio signal; and allow the first radio device to connect to the coordinator in response to the association request.

11. A method in a radio device in a radio communication network, the method comprising:

sending a first broadcast radio signal from the radio device, the first broadcast radio signal comprising a token identifying the first radio device;

receiving a second broadcast radio signal from a coordinator in a Machine-to-Machine (M2M) Gateway for controlling access of radio devices in the radio communication network, said second broadcast radio signal comprising a device filter comprising a plurality of tokens identifying a plurality of devices authorised to connect to the coordinator;

determining that the token identifying the radio device is included in the device filter, informing the radio device that it is authorised to connect to the coordinator;

sending an association request to the coordinator in response to determining the token identifying the radio device is included in the device filter; and receiving an association response and connecting to the coordinator.

12. A radio device configured for use in a radio communication network, the radio device comprising:

communication circuitry configured for radio communication with a coordinator in a Machine-to-Machine (M2M) Gateway for controlling access of radio devices in the radio communication network;

processor circuitry; and a storage unit storing instructions that, when executed by the processor circuitry, cause the radio device to:

send a first broadcast radio signal from the radio device, the first broadcast radio signal comprising a token identifying the radio device;

receive a second broadcast radio signal from the coordinator, said second broadcast radio signal comprising a device filter comprising a plurality of tokens identifying a plurality of devices authorised to connect to the coordinator;

determine that the token identifying the radio device is included in the device filter, informing the radio device that it is authorised to connect to the coordinator;

send an association request to the coordinator in response to determining the token identifying the radio device is included in the device filter; and receive an association response and connect to the coordinator.

13. The radio device of claim 12, wherein the token is a code flashed into the radio device.

14. A non-transitory computer readable medium for a radio device in a radio communication network, the non-transitory computer readable medium comprising computer program code which is able to, when run on processor circuitry in the radio device, cause the radio device to:

send a first broadcast radio signal from the radio device, the first broadcast radio signal comprising a token identifying the radio device;

receive a second broadcast radio signal from a coordinator in a Machine-to-Machine (M2M) Gateway for controlling access of radio devices in the radio communication network, said second broadcast radio signal comprising a device filter comprising a plurality of tokens identifying a plurality of devices authorised to connect to the coordinator;

determine that the token identifying the radio device is included in the device filter, informing the radio device that it is authorised to connect to the coordinator;

send an association request to the coordinator in response to determining the token identifying the radio device is included in the device filter; and receive an association response and connect to the coordinator.

* * * * *